US008149372B2

(12) United States Patent
Lee et al.

(10) Patent No.: US 8,149,372 B2
(45) Date of Patent: Apr. 3, 2012

(54) IPS LIQUID CRYSTAL DISPLAY PANEL HAVING SPACER HOLES FORMED BETWEEN COMMON LINES AND GATE LINES

(75) Inventors: Myoung Ho Lee, Gyeonggyi-do (KR); Min Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1353 days.

(21) Appl. No.: 11/450,288

(22) Filed: Jun. 12, 2006

(65) Prior Publication Data

US 2007/0002261 A1 Jan. 4, 2007

(30) Foreign Application Priority Data

Jun. 29, 2005 (KR) .................... 10-2005-0057155

(51) Int. Cl.
G02F 1/1335 (2006.01)
G02F 1/1343 (2006.01)
G02F 1/1345 (2006.01)

(52) U.S. Cl. .................. 349/155; 349/106; 349/141

(58) Field of Classification Search .......... 349/155, 349/106, 141
See application file for complete search history.

(56) References Cited

U.S. PATENT DOCUMENTS

| 6,466,295 | B1 * | 10/2002 | Hsieh | 349/155 |
| 2002/0003519 | A1 * | 1/2002 | Kim | 345/87 |
| 2002/0057411 | A1 * | 5/2002 | Kim et al. | 349/141 |
| 2005/0237469 | A1 * | 10/2005 | Kadotani et al. | 349/155 |

FOREIGN PATENT DOCUMENTS

| KR | 10-2003-0087479 | 11/2003 |
| KR | 10-2004-0036640 | 4/2004 |
| KR | 10-2005-0022265 | 3/2005 |

* cited by examiner

*Primary Examiner* — Lauren Nguyen
(74) *Attorney, Agent, or Firm* — Morgan, Lewis & Bockius LLP

(57) ABSTRACT

A liquid crystal display panel according includes a gate line and a data line crossing each other on a first substrate, a common electrode formed in parallel to the data line, a common line connected to the common electrode and arranged in parallel to the gate line, a gate insulating film formed between the gate and data lines to cover the gate line, the common line and the common electrode, a thin film transistor formed at a crossing part of the gate and data lines, a passivation film covering the thin film transistor, the data line and the gate insulating film, a pixel electrode connected to the thin film transistor, a spacer hole penetrating the gate insulating film and the passivation film, and at least one ball spacer formed in the spacer hole.

2 Claims, 13 Drawing Sheets

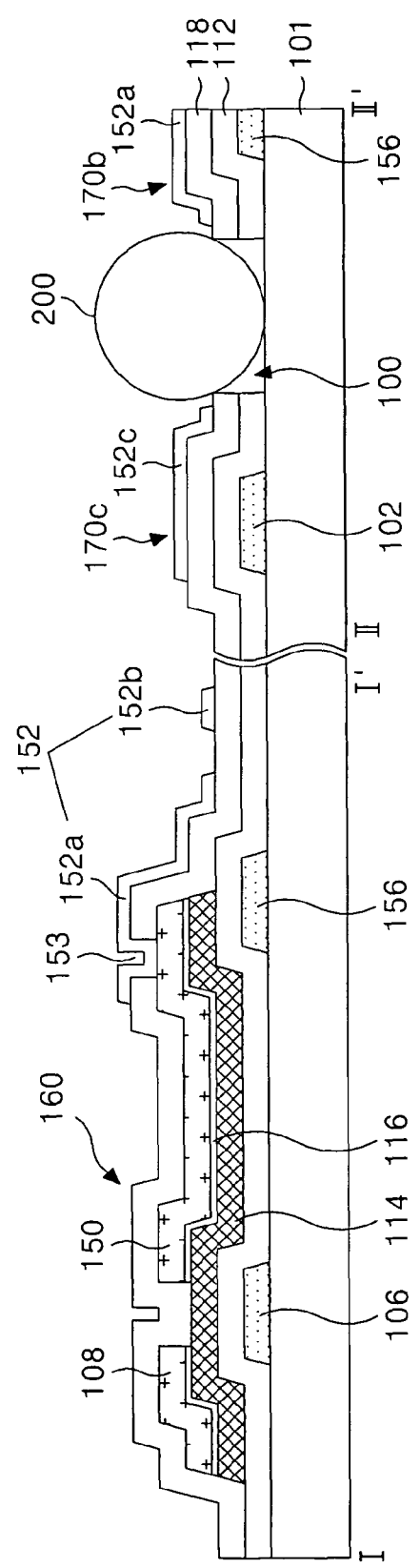

IPS LIQUID CRYSTAL DISPLAY PANEL HAVING SPACER HOLES FORMED BETWEEN COMMON LINES AND GATE LINES

This application claims the benefit of the Korean Patent Application No. P2005-0057155 filed in Korea on Jun. 29, 2005 which is hereby incorporated by reference.

BACKGROUND OF THE INVENTION

1. Field of the Invention

The present invention relates to a liquid crystal display (LCD) panel, and more particularly, to an LCD panel that is capable of minimizing the movement of a spacer of LCD panel, and a method of fabricating the LCD panel.

2. Discussion of the Related Art

In general, an LCD device utilizes an electric field to control light transmittance of liquid crystal, thereby displaying an image. The LCD device typically includes an LCD panel where liquid crystal cells are arranged in a matrix shape, and a drive circuit for driving the LCD panel. The LCD panel includes pixel electrodes and a reference electrode, i.e., a common electrode, which apply the electric field to the liquid crystal cells. The pixel electrodes are arranged on a lower substrate for the respective liquid crystal cells, whereas the common electrode is integrated into the front surface of an upper substrate. Each of the pixel electrodes is connected to a thin film transistor (TFT) that serves as a switching device. The pixel electrodes together with the common electrode drive the liquid crystal cells in accordance with a data signal supplied through the TFT. The LCD device may be classified either as a twisted nematic (hereinafter, referred to as 'TN') mode or an in-plane switch (hereinafter, referred to as 'IPS'). In accordance with the direction of an electric field that drives the liquid crystal, the TN mode applies a vertical direction electric field, whereas the IPS mode applies a horizontal direction electric field to broaden a viewing angle.

FIG. 1 is a cross sectional view schematically illustrating an LCD panel of the IPS mode according to the related art. As shown in FIG. 1, the LCD panel has a wide viewing angle because a common electrode 28 is arranged on a lower substrate 1 so that liquid crystal 34 can rotate on the basis of a horizontal direction by a horizontal electric field. The common electrode 28 has a stripe shape and is arranged alternately with a pixel electrode 22 in a display area. Moreover, the common electrode 28 is formed of the same metal at the same time as a gate electrode 6 on the lower substrate 1.

A lower plate DP, including the common electrode 28 and the pixel electrode 22, is formed to face an upper plate UP, including an upper substrate 31, a black matrix 2 and a color filter 30. A ball spacer 36 is arranged between the lower plate DP and the upper plate UP to provide a space into which the liquid crystal 34 is injected therebetween. The ball spacer 36 is formed by being sprayed on at least any one of the substrates 1, 31 of the upper plate UP and the lower plate DP, respectively. The ball spacer 36 should be uniformly scattered for uniformly keeping a cell gap of the liquid crystal cell.

Also, as shown in FIG. 1, references 8 and 10 denote source and drain electrodes, reference numerals 14 and 16 denote active layer and contact layer, reference numeral 12 denotes a gate insulating film, 18 denotes a passivation film, and reference numerals 24a and 24b denote upper alignment and lower alignment.

However, it is difficult to uniformly scatter the ball spacer 36 due to a limitation in the uniformity of the scattering method. If the ball spacer 36 is scattered non-uniformly, the cell gap becomes non-uniform, thereby generating a spot on a screen. Moreover, if a pressure is applied to a display area of the LCD panel including the ball spacer 36, the ball spacer 36 moves between the upper plate UP and the lower plate DP, thereby causing a ripple phenomenon, which causes an image displayed in the display area to become dark in a wave shape.

In order to resolve the above problems of the ball spacer 36, it is suggested to fix and pattern a column spacer at a specific location. However, since the column spacer is formed by a photolithography process, in which more than 95% of a spacer material is removed, the usage rate of the material is very low and also the fabrication processes are complicated. In order to improve the usage rate of the material and simplify the fabrication processes, there has been developed a method for forming a ball spacer utilizing an ink-jet spraying device. This method can control the location of forming the ball spacer, which is different from the ball spacer scattering method that has the limitation in the uniformity thereof.

FIG. 2 is a view schematically showing an example of a spacer arrangement of an LCD panel according to the related art. As shown in FIG. 2, the ball spacers 36 are formed by the ink-jet method. In order to prevent the ball spacers 36 from moving between the upper plate UP and the lower plate DP, the ball spacers 36 are disposed at a fixed point such that the ball spacers 36 are each formed in a groove at a location where the ball spacers 36 are to be formed between the upper and lower plates.

However, the ball spacers 36 may be moved by a pressure, shock, impact, etc., which are applied in a process after the ball spacer 36 has been formed. FIG. 3 is a view schematically showing an exemplary phenomenon in that the ball spacers 36 of FIG. 2 are moved in a process after they have been arranged. As shown in FIG. 3, even though the ball spacers 36 have each been arranged by the ink-jet method at the fixed point with the groove formed at the desired location as shown in FIG. 2, the ball spacers 36 are moved as shown in FIG. 3 due to the pressure, shock or impact. Accordingly, in the related art, since the ball spacers 36 are moved in the display area of the color filter 30, the uniformity of the cell gap and the contrast ratio are deteriorated.

FIG. 4 is a plan view showing part of a thin film transistor (TFT) array substrate of the IPS mode as another example according to the related art. As shown in FIG. 4, the TFT array substrate includes a gate line 42 and a data line 44 that are arranged crossing each other on a lower substrate, a TFT 60 that is formed at each crossing part of the gate and date lines 42 and 44, a pixel electrode 52 and a common electrode 54 that are arranged to form a horizontal electric field in a pixel area 45 provided in the crossing structure, and a common line 56 that is connected to the common electrode 54.

The pixel electrode 52 consists of a first pixel electrode 52a in parallel to the gate line 42 and a second pixel electrode 52b in parallel to the data line 44. The common line 56 together with the first pixel electrode 52a forms a storage capacitor 70/80 with a gate insulating film (not shown) therebetween. The TFT 60 serves to make a pixel signal of the data line 44 charged and maintained in the pixel electrode 52 in response to a gate signal of the gate line 42. To this end, the TFT 60 is provided with a gate electrode connected to the gate line 42, a source electrode 48 connected to the data line 44, and a drain electrode 50 connected to the pixel electrode 52. The source electrode 48 consists of a first source part 48b projected from the data line 44 and a second source part 48a formed in a 'U' shape by being projected in two directions from the first source part 48b. The drain electrode 50 is formed to face the second source part 48a of the source electrode 48 with a channel of the 'U' shape therebetween. Moreover, the drain electrode 50 is connected to the first electrode part 52a of the pixel electrode 52 through a contact hole 53. However, in the related art as shown by FIG. 4, a space for forming a ball spacer is not secured between the gate line 42 and the storage capacitor 80 adjacent to the thin film transistor 60.

SUMMARY OF THE INVENTION

Accordingly, the present invention is directed to a liquid crystal display (LCD) panel and a fabricating method thereof that substantially obviate one or more problems due to limitations and disadvantages of the related art.

An object of the present invention is to provide an LCD panel that is capable of preventing a spacer of the LCD panel from moving, and a fabricating method thereof.

Additional advantages, objects, and features of the invention will be set forth in part in the description which follows, and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other objects of the invention, the LCD panel according to an aspect of the present invention includes a gate line and a data line which are formed on a first substrate to cross each other with a gate insulating film therebetween; a common electrode formed in parallel to the data line; a common line which is connected to the common electrode and is formed in parallel to the gate line; a gate insulating film formed to cover the gate line, the gate electrode, the common line and the common electrode; a thin film transistor formed at a crossing part of the gate line and the data line; a passivation film formed to cover the thin film transistor, the data line and the gate insulating film; a pixel electrode connected to the thin film transistor; a spacer hole which penetrates the gate insulating film and the passivation film; and at least one ball spacer formed in the spacer hole.

In the LCD panel, the pixel electrode includes a first electrode part overlapped with the common line with the gate insulating film therebetween; a second electrode part formed in parallel to the common electrode to form a horizontal electric field; and a third electrode part overlapped with the gate line with the gate insulating film therebetween, and the spacer hole is formed between the second electrode part and the third electrode part.

The LCD panel further includes a black matrix formed on a second substrate; red, blue, green color filters formed on the black matrix; and a color filter spacer hole which penetrates the red, blue and green color filters, in an area which faces the spacer hole.

A fabricating method of a LCD panel according to another aspect of the present invention includes the steps of forming a gate line, a gate electrode connected to the gate line, a common line which is in parallel to the gate line, and a common electrode connected to the common line, on a first substrate; forming a gate insulating film to cover the gate line, the gate electrode, the common line and the common electrode; forming data lines to cross the gate line and forming a thin film transistor in an area where the gate line cross the data line; forming a passivation film which covers the thin film transistor, the data line, the gate insulating film; forming a spacer hole and a contact hole of the thin film transistor; forming a pixel electrode inclusive of a first electrode part overlapped with the common line with the gate insulating film therebetween and connected to the thin film transistor through the contact hole, a second electrode part formed in parallel to the common electrode to form a horizontal electric field, and a third electrode part overlapped with the gate lines with the gate insulating film therebetween; and forming at least one ball spacer in the spacer hole.

The fabricating method further includes the steps of forming a black matrix on a second substrate; and forming red, blue, green color filters inclusive of a color filter spacer hole on the black matrix, and the color filter spacer hole penetrates the red, blue and green color filters and is formed in an area which faces the spacer hole formed in the first substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 6 is a view schematically illustrating a cross sectional structure of the thin film transistor array substrate of FIG. 5, taken along the lines I-I', II-II';

DETAILED DESCRIPTION OF THE PREFERRED EMBODIMENTS

Reference will now be made in detail to the preferred embodiments of the present invention, examples of which are illustrated in the accompanying drawings. With reference to FIGS. 5 to 9, exemplary embodiments of the present invention will be explained as follows.

Figure 1:
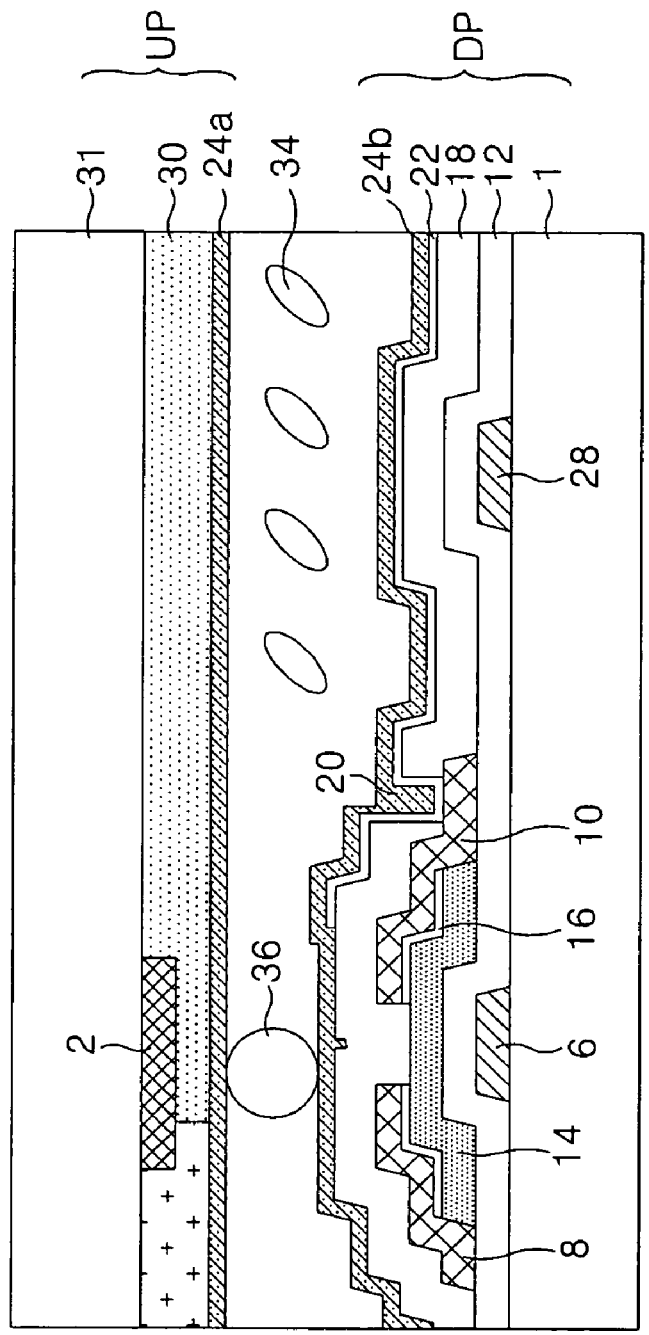
FIG. 1 is a cross sectional view schematically illustrating an LCD panel of the IPS mode according to the related art.
Figure 2:
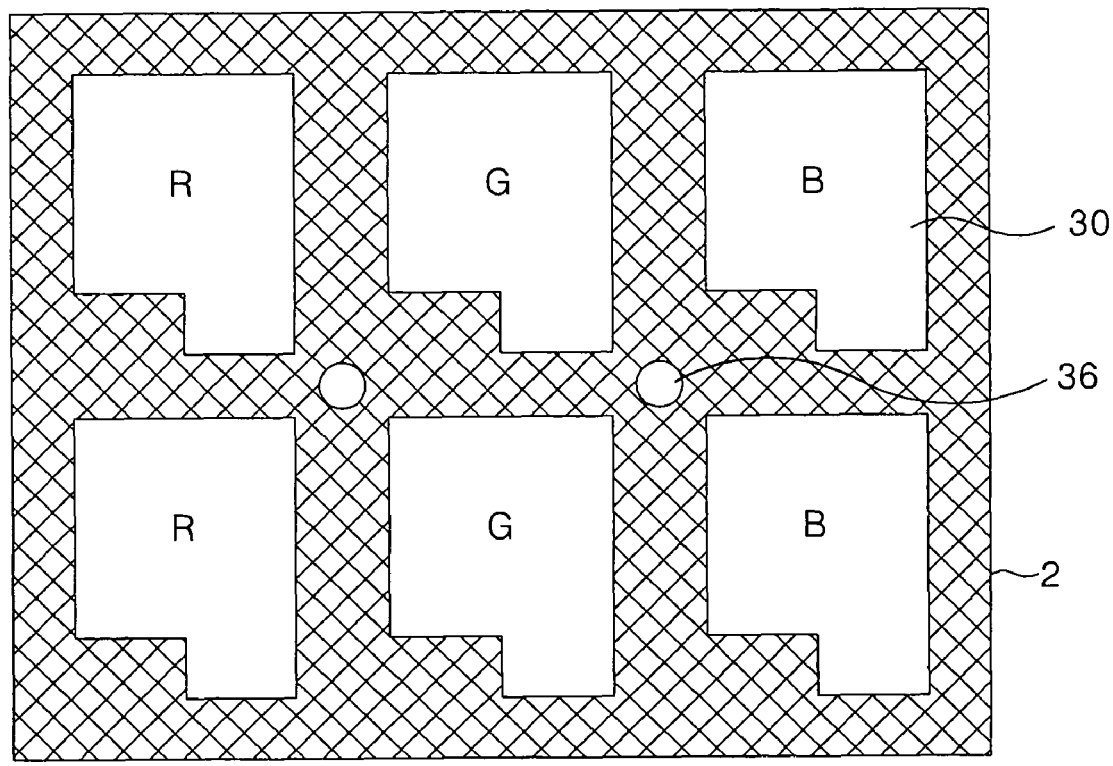
FIG. 2 is a view schematically showing an example of arranging ball spacers of an LCD panel according to the related art.
Figure 3:
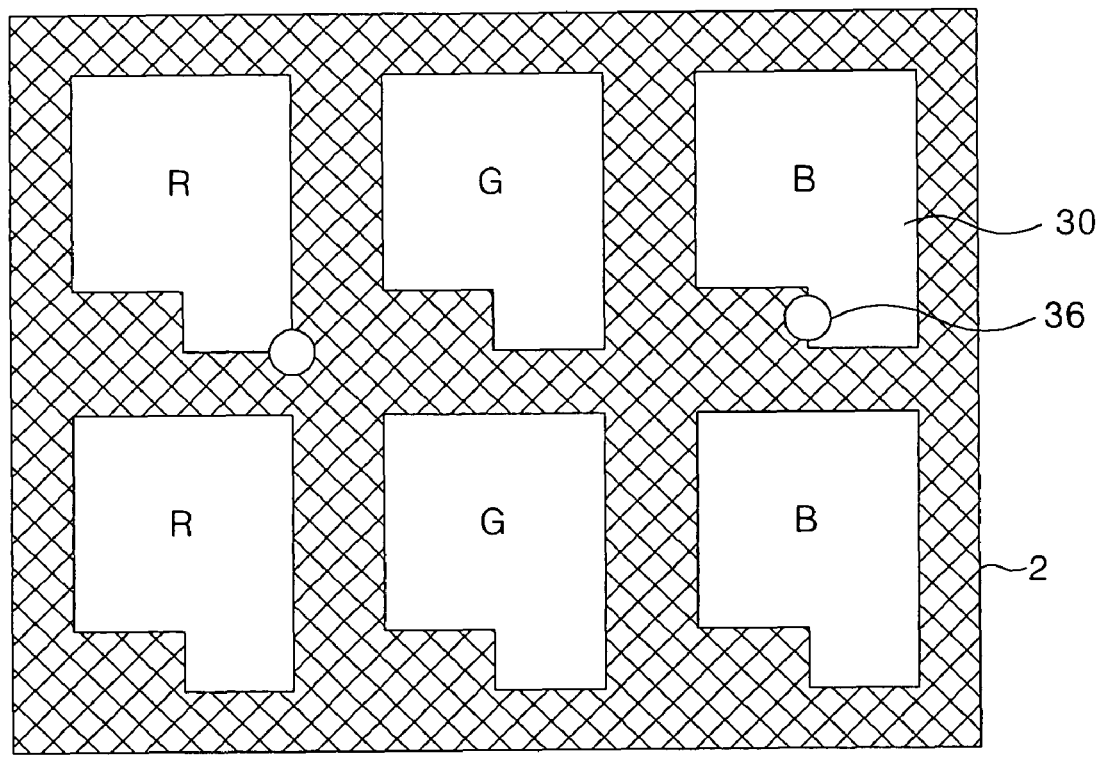
FIG. 3 is a view schematically showing an exemplary phenomenon in that the ball spacers of FIG. 2 are moved in a process after they are arranged.
Figure 4:
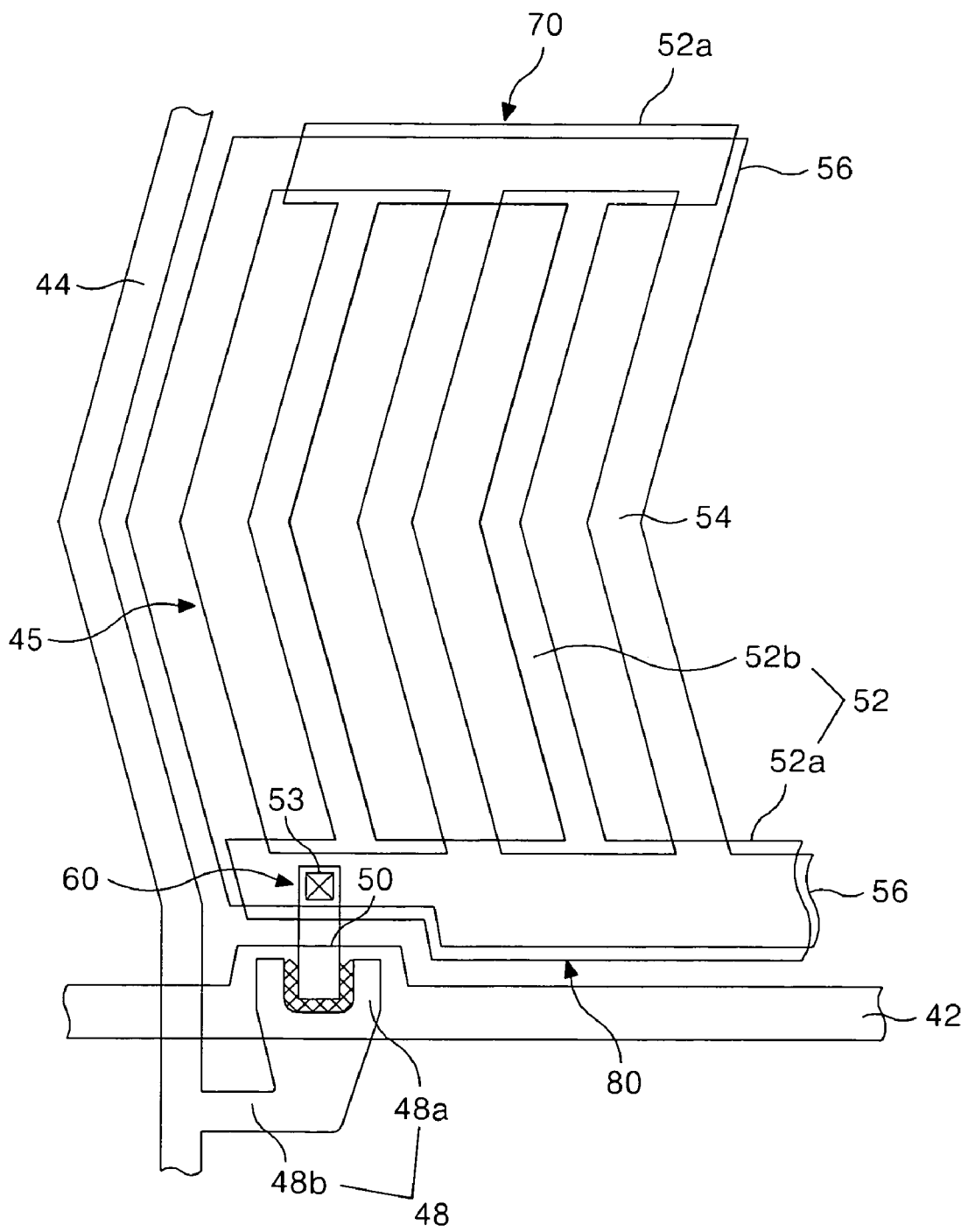
FIG. 4 is a plan view schematically illustrating part of a thin film transistor array substrate according to the related art.
Figure 5:
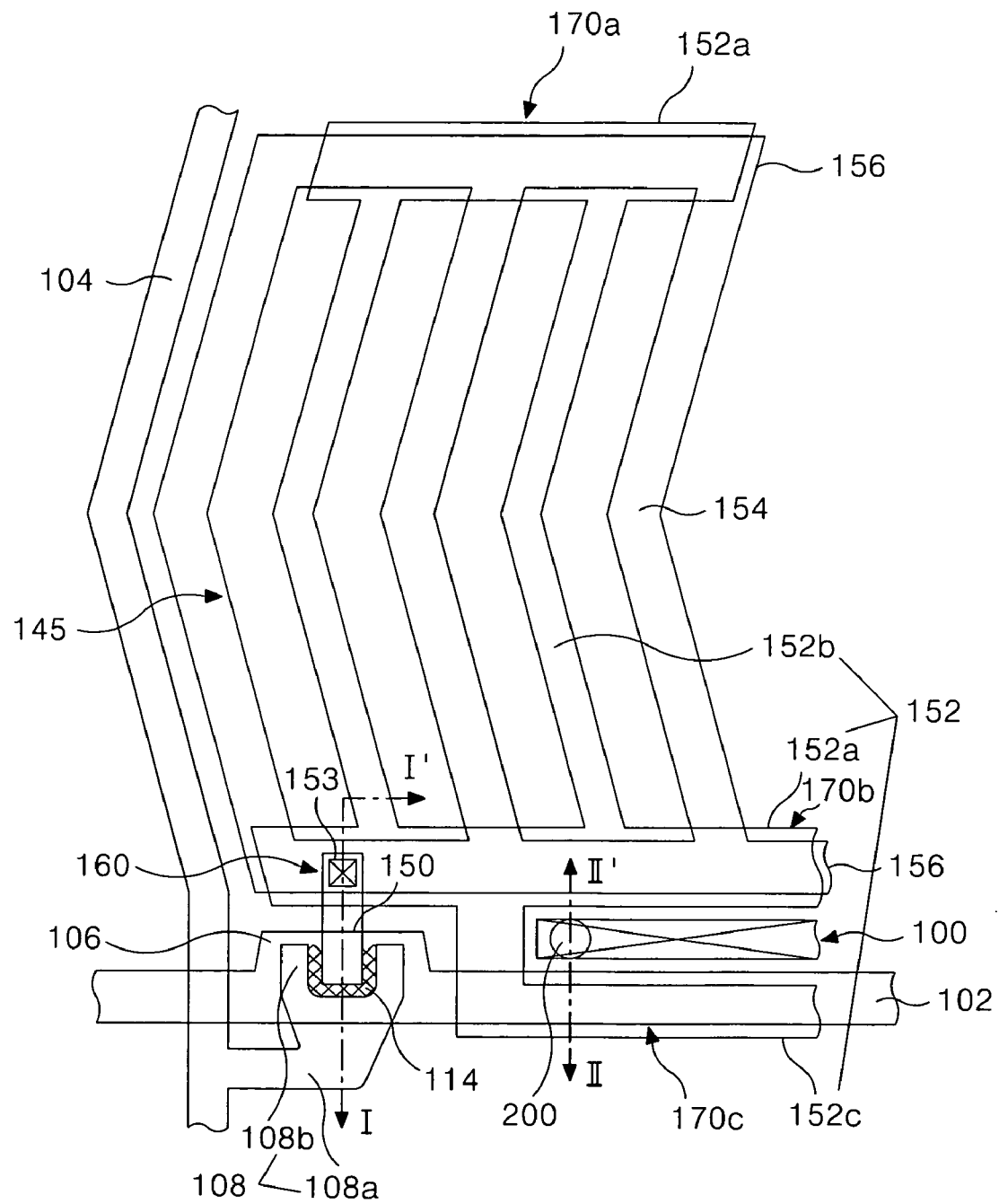
FIG. 5 is a plan view schematically illustrating part of a thin film transistor array substrate according to an exemplary embodiment of the present invention.

FIG. 5 is a plan view partially and schematically illustrating a thin film transistor array substrate according to an exemplary embodiment of the present invention. FIG. 6 is a view schematically illustrating a cross sectional structure of the thin film transistor array substrate of FIG. 5, taken along the lines I-I', II-II'. Unlike the related art as shown in FIG. 4, in the TFT array substrate according to this exemplary embodiment, a spacer hole 100 is secured where a ball spacer 200 is to be formed as shown in FIGS. 5 and 6.

The TFT array substrate includes a gate line 102 and a data line 104 that are arranged crossing each other on a first lower substrate 101, a TFT 160 that is formed at each crossing part of the gate and data line 102 and 104, a pixel electrode 152 and a common electrode 154 that are arranged to form a horizontal electric field in a pixel area 145 provided by the crossing structure, and a common line 155 that is connected to the common electrode 154. Also, as shown in FIG. 5, the data line 104 includes a part having a 'V' shape, i.e., a shape of a slanting line bent in an up and down symmetry at a center of the pixel area.

The TFT array substrate further includes first and second storage capacitors 170a and 170b inclusive of a first electrode part 152a of the pixel electrode 152 that is overlapped with and insulated from the horizontal common line 156, and a third storage capacitor 170c inclusive of a third electrode part 152c of the pixel electrode 152 that is overlapped with and insulated from the gate line 102. Furthermore, the spacer hole 100 is a space where the spacer ball 200 is to be formed between the second storage capacitor 170b and the third storage capacitor 170c. The gate line 102 supplies a gate signal to a gate electrode 106 of the TFT 160, and the data line 104 supplies a pixel signal to the pixel electrode 152 through a drain electrode 150 of the TFT 160.

The TFT 160 serves to make the pixel signal of the data line 104 charged and maintained in the pixel electrode 152 in response to a gate signal of the gate line 102. To this end, the TFT 160 is provided with the gate electrode 106 connected to the gate line 102, a source electrode 108 connected to the data line 104, and the drain electrode 150 connected to the pixel electrode 152. The source electrode 108 includes a first source part 108a projected from the data line 104 and a second source part 108b formed in a 'U' shape by being projected in two directions from the first source part 108a. The drain electrode 150 is formed to face the second source part 108b of the source electrode with a channel of the 'U' shape therebetween.

As shown in FIGS. 5 and 6, the drain electrode 150 is connected to the first electrode part 152a of the pixel electrode 152 through a contact hole 153 that penetrates a passivation film 118. The TFT 160 is also provided with an active layer 114 that overlaps with the gate electrode 106 with a gate insulating film 112 therebetween, thereby forming a channel between the source electrode 108 and the drain electrode 150, and an ohmic contact layer 116 that is formed in ohmic contact with the source electrode 108 and the drain electrode 150. Herein, the ohmic contact layer 116 serves to expose the active layer 114 in the 'U' shape. The pixel electrode 152 includes a first electrode part 152a, a second electrode part 152b and a third electrode part 152c. The first electrode part 152a is formed in parallel and overlapped with the common line 156 on the substrate 101. The gate insulating film 112 is arranged between the first electrode part 152a and the common line 156. The second electrode part 152b is connected to the first electrode part 152a and is formed in parallel to the data line 104. The third electrode part 152c is connected to the second electrode part 152b, and is formed in parallel and overlapped with the gate line 102. The gate insulating film 112 is also arranged between the third electrode part 152c and the gate line 102.

The common line 156 is formed in parallel to the gate line 102 and is also separated from the gate line 102 with a designated gap. The common line 156 serves to supply the common electrode 154 with a reference voltage for driving liquid crystal. The common line 156 and the common electrode 154 may be formed of the same metal on the same plane as the gate line 102. Moreover, as shown in FIG. 5, the common electrode 154 is formed extending from the common line 156 and in parallel to the second electrode part 152b of the pixel electrode 152.

The TFT array substrate has a horizontal electric field formed between the pixel electrode 152 to which the pixel signal is supplied through the TFT 160 and the common electrode 154 to which the reference voltage is supplied through the common line 156. In particular, the horizontal electric field is formed between the second electrode part 152b of the pixel electrode 152 and the common electrode 154. By such a horizontal electric field, the liquid crystal molecules arranged in a horizontal direction between the TFT array substrate and the color filter array substrate are rotated by dielectric anisotropy. The transmittance of the light transmitted through the pixel area is changed in accordance with the degree of rotation of the liquid crystal molecules, thereby displaying a picture.

The storage capacitor makes the signal charged in the pixel electrode 152 stably maintained until the next pixel signal is charged therein. The storage capacitor includes first and second storage capacitors 170a and 170b that overlap the common line 156. As shown in FIG. 5, the second storage capacitor 170b in this exemplary embodiment is formed to be narrower than the second storage capacitor 80 of FIG. 4, thereby securing a space for the space hole 100 to receive the spacer ball 200. The second storage capacitor 170b, which is made narrow in this way, is compensated by forming a third storage capacitor 170c that includes the third electrode part 152c of the pixel electrode 152 overlapped with the gate line 102 with the gate insulating film 112 (of FIG. 6) therebetween. Moreover, as shown in FIG. 6, the spacer hole 100 is formed by penetrating the passivation film 118 and the gate insulating film 112, so that a portion of the first lower substrate 101 is exposed by the spacer hole 100. In result, the spacer ball 200 is confined twice by the passivation film 118 and the gate insulating film 112, thereby further minimizing the movement of the spacer ball 200.

Figure 7A:
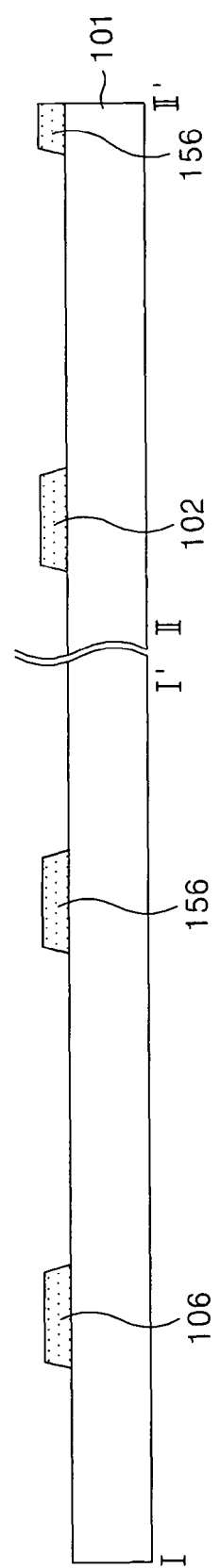
FIGS. 7A to 7E are views schematically illustrating a fabricating method of the thin film transistor array substrate of FIG. 5 according to an exemplary embodiment of the present invention.
Figure 7B:
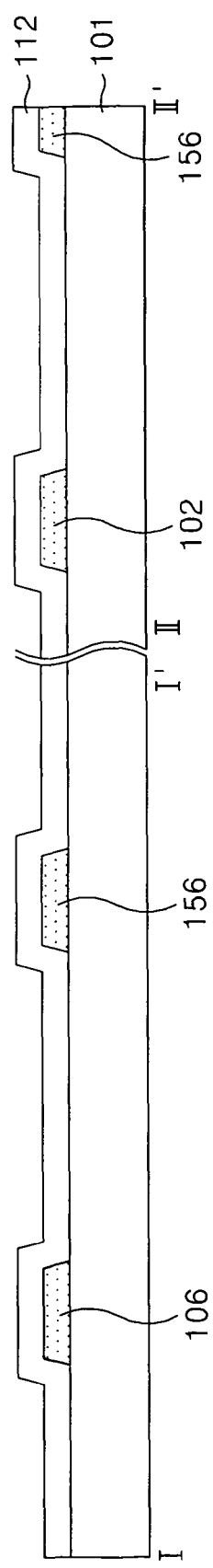

FIGS. 7A to 7E are views schematically illustrating an exemplary process of fabricating the TFT array substrate of FIG. 6. As shown in FIG. 7A, the gate electrode 106, the gate line 102, the common line 156, and the common electrode 154 (not shown but extending from the common line 156) are arranged on the first lower substrate 101. Specifically, a gate metal layer is formed on the first lower substrate 101 by a deposition method such as the sputtering. Herein, the gate metal layer may include aluminum Al group metals, copper Cu, chrome Cr, molybdenum Mo, etc. The gate metal layer is patterned by a photolithography process using a mask and an etching process, thereby forming the gate electrode 106, the gate line 102, the common line 156 and the common electrode 154. As shown in FIG. 7B, the gate insulating film 112 is deposited to cover the gate electrode 106, the gate line 102, and the common line 156 including the not-shown common electrode 154. In this exemplary embodiment, the gate insulating film 112 may be made of an inorganic insulating material such as silicon oxide SiOx, silicon nitride SiNx, or an organic insulating material such as BCB (benzocyclobutene), acrylic resin, PFCB (perfluorocyclobutane).

Figure 7C:
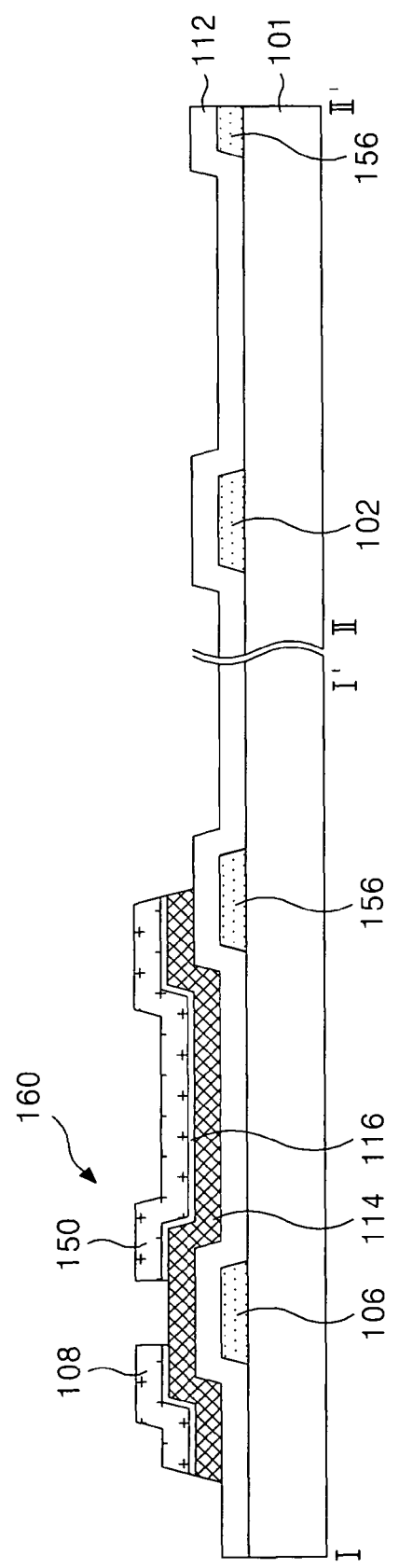

As shown in FIG. 7C, the TFT 160 pattern is formed on the gate insulating film 112. The TFT 160 pattern includes a semiconductor pattern having the active layer 114 and the ohmic contact layer 116, the source electrode 108, the drain electrode 150, and a part where the active layer 114 is exposed between the source electrode 108 and the drain electrode 150, and the data line 104 (not shown). Specifically, an active layer forming material, an ohmic contact layer forming material and a source/drain metal layer forming material are sequentially deposited on the gate insulating film 112 by a method such as PECVD, sputtering, etc. In this exemplary embodiment, an amorphous silicon that is not doped with impurities may be utilized for forming the active layer 114, whereas an amorphous silicon which is doped with n-type or p-type impurities may be utilized for forming the ohmic contact layer 116. Moreover, copper Cu, molybdenum Mo, titanium Ti, tantalum Ta, molybdenum Mo alloy, etc., may be utilized for forming the source/drain metal layer 108/150. A photo-resist is spread on the active layer forming material, the ohmic contact layer forming material and the source/drain metal layer forming material. Thus, the TFT 160 pattern is formed by the photolithography process using the diffractive exposure mask or the halftone mask and the etching process.

After that, a passivation film forming material is spread to cover the gate insulating film 112, the TFT 160 pattern and the data line 104, so as to form the passivation film 118. An inorganic insulating material like the gate insulating film 112 or an organic insulating material with low dielectric constant such as acrylic organic compound, BCB (benzocyclobutene), PFCB (perfluorocyclobutane), etc., may be utilized as the passivation film forming material.

Figure 7D:
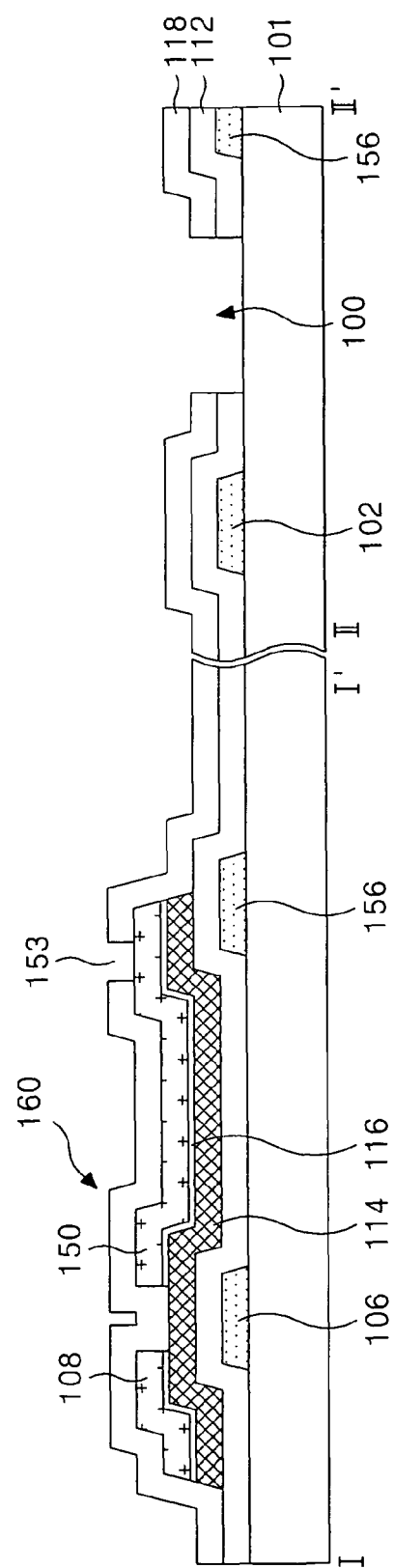

As shown in FIG. 7D, after spreading the photo-resist on the thus-formed passivation film 118, space parts for forming the contact hole 153 and the spacer hole 100 are formed by the photolithography process using the diffractive exposure mask or halftone mask and the etching process. The space part for forming the spacer hole 100 is formed to penetrate the gate insulating film 112 and the passivation film 118, thereby generating a stepped difference of 5000 Å~8000 Å in the fabrication process.

Figure 7E:
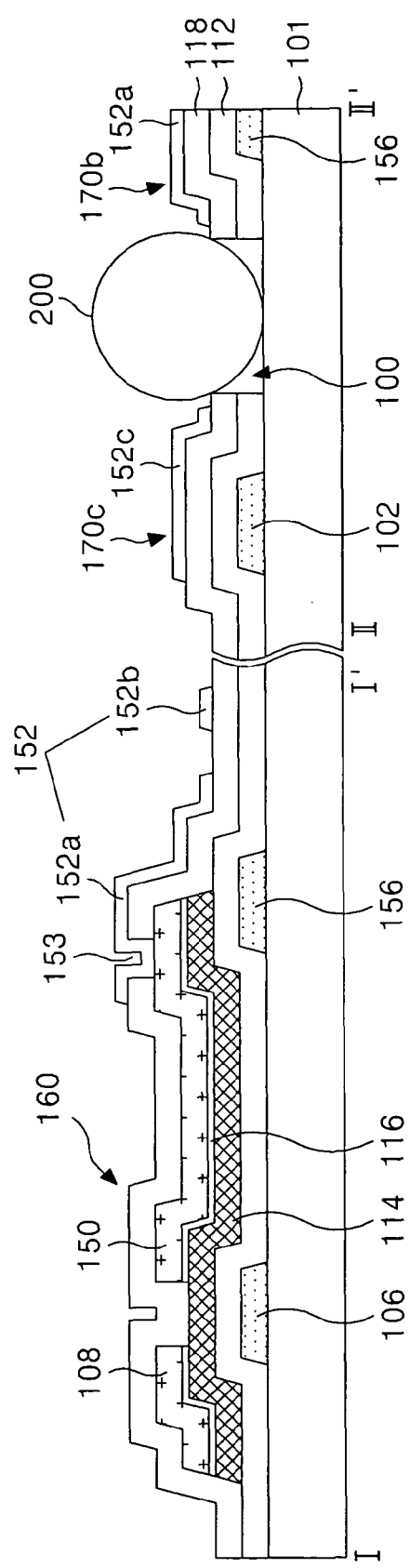

As shown in FIG. 7E, the pixel electrode 152 is formed on the passivation film 118 and the contact hole 153. Specifically, a transparent conductive film is spread on the passivation film 118 and the contact hole 153 by a deposition method such as the sputtering, etc. In the exemplary embodiment, ITO (indium tin oxide), TO (tin oxide), IZO (indium zinc oxide) or ITZO (indium tin zinc oxide) may be utilized as a material for the transparent conductive film. The transparent conductive film is patterned by the photolithography process and the etching process, thereby forming the pixel electrode 152. And then, the ball spacer 200 is thus formed in the spacer hole 100.

Figure 8:
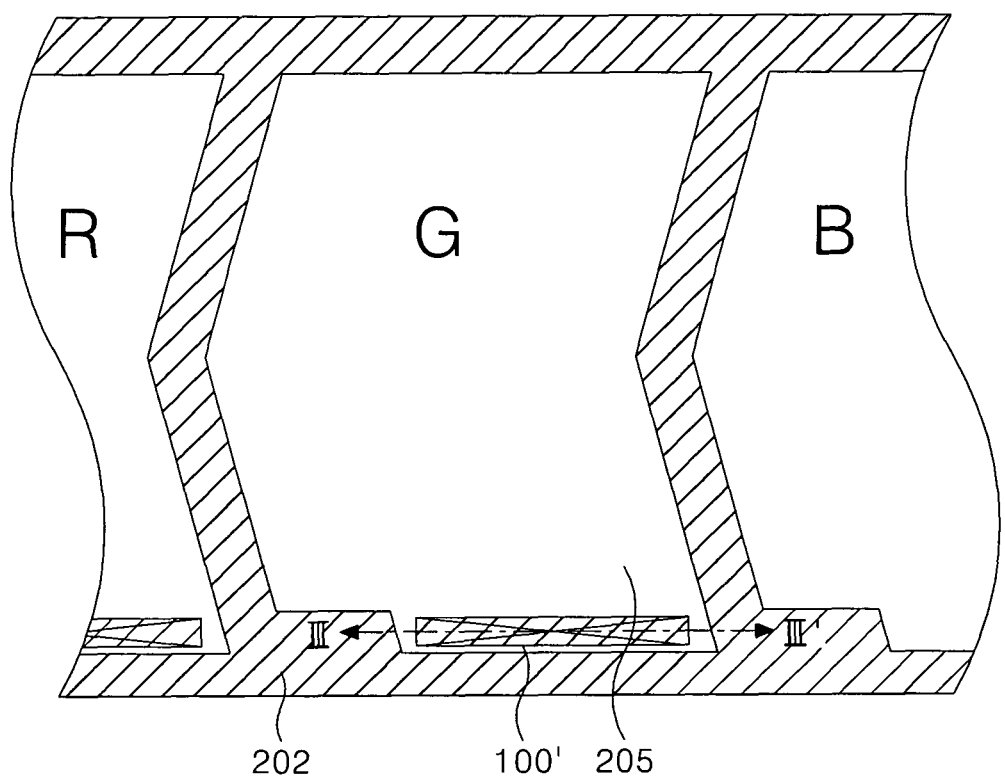
FIG. 8 is a plan view schematically illustrating part of a color filter array substrate according to an exemplary embodiment of the present invention.

FIG. 8 is a plan view schematically illustrating part of a color filter array substrate according to an exemplary embodiment of the present invention. As shown in FIG. 8, the color filter array substrate, which is formed to face the TFT array substrate shown in FIG. 5, includes a color filter space hole 100' formed in an area corresponding to the spacer hole 100, thereby enabling to further minimize the movement of the spacer 200. The color filter spacer hole 100' is formed in a well type to penetrate a color filter 205.

Figure 9:
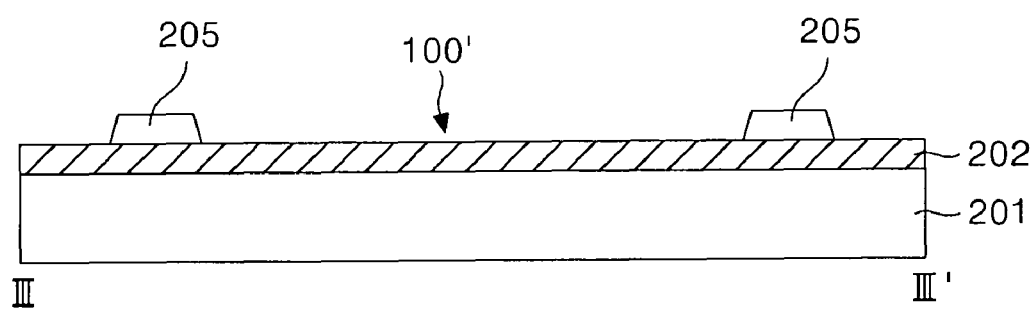
FIG. 9 is a view schematically illustrating a cross sectional structure of the color filter array substrate of FIG. 8, taken along the line III-III'.

FIG. 9 is a diagram schematically illustrating a cross sectional structure of the color filter array substrate of FIG. 8, taken along the line III-III'. As shown in FIG. 9, a black matrix 202 for preventing light leakage is formed on a second lower substrate 201, and red R, green G and blue B color filters 205 inclusive of a well type color filter spacer hole 100' are formed on the black matrix 202. The black matrix 202 may be formed of an opaque metal such as chrome Cr, chrome alloy, black resin, etc. by the photolithography process and the etching process. The red R, green G and blue B color filters 205 inclusive of the well type color filter spacer hole 100' may be formed by the photolithography process and the etching process. In this way, the spacer ball 200, the spacer hole 100 and the color filter spacer hole 100' may be formed to be one or more without being limited to only one.

As described above, the LCD panel and the fabricating method thereof according to the exemplary embodiments of the present invention provides the well type spacer hole formed on the TFT array substrate by the passivation film and the gate insulating film, and forms the ball spacer within the spacer hole. Accordingly, the phenomenon in that the ball spacer is moved to the pixel area can be prevented because the ball spacer is confined by the passivation film and the gate insulating film, thereby improving the uniformity of the cell gap and also preventing the light leakage. Further, the well type color filter spacer hole is formed in the area corresponding to the spacer hole on the color filter array substrate which faces the TFT array substrate, so as to increase the thickness of the films by which the spacer ball is confined, thereby further minimizing the movement of the spacer ball into the pixel area.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:
1. A liquid crystal display (LCD) panel, comprising:
a first substrate and a second substrate that face each other;
a gate line and a data line that are arranged crossing each other on the first substrate;
a common electrode that is formed in parallel to the data line;
a common line that is connected to the common electrode and is formed in parallel to the gate line;
a gate insulating film that is formed between the gate line and the data line and covers the gate line, the common line and the common electrode;
a thin film transistor that is formed at a crossing part of the gate line and the data line;
a passivation film that is arranged covering the thin film transistor, the data line and the gate insulating film;
a pixel electrode that is connected to the thin film transistor;
a spacer hole that penetrates the gate insulating film and the passivation film to expose a portion of the first substrate between the gate line and the common line; and
at least one ball spacer that is arranged in the spacer hole,
wherein the pixel electrode includes:
a first electrode part that is overlapped with the common line such that the gate insulating film is arranged between the first electrode and the common line;
a second electrode part that is formed in parallel to the common electrode to form a horizontal electric field; and
a third electrode part that is overlapped with the gate line such that the gate insulating film is arranged between the third electrode part and the gate line, wherein the spacer hole is formed between the first electrode part and the third electrode part.

2. The LCD panel according to claim 1, further comprising:
a black matrix that is formed on the second substrate;
red, blue, green color filters that are formed on the black matrix; and
a color filter spacer hole that penetrates the red, blue and green color filters in an area facing the spacer hole.

* * * * *